(12) United States Patent
Coons

(10) Patent No.: US 6,862,870 B1
(45) Date of Patent: Mar. 8, 2005

(54) REMOVABLE COVER FOR EQUINE LEG STRAPS AND TAIL STRAPS

(76) Inventor: Anita M. Coons, 39 S. Martin Rd., Amesbury, MA (US) 01913

( * ) Notice: Subject to any disclaimer, the term of this patent is extended or adjusted under 35 U.S.C. 154(b) by 0 days.

(21) Appl. No.: 10/709,191

(22) Filed: Apr. 20, 2004

(51) Int. Cl.$^7$ .................................................. B68C 5/00
(52) U.S. Cl. ........................................ 54/79.2; 54/23
(58) Field of Search .................... 119/850, 856; 54/23, 54/46.1, 78, 79.1, 79.2

(56) References Cited

U.S. PATENT DOCUMENTS

| | | | |
|---|---|---|---|
| 1,051,618 A | * | 1/1913 | Murphy ........................ 54/79.2 |
| 1,609,577 A | * | 12/1926 | Schroedter .................. 54/79.2 |
| 1,678,373 A | | 7/1928 | Wiesenfeld |
| 3,466,852 A | | 9/1969 | Stoner ............................ 54/65 |
| 4,147,015 A | | 4/1979 | Land .............................. 54/23 |
| 4,570,424 A | | 2/1986 | Simpson ........................ 54/23 |
| 5,134,836 A | | 8/1992 | Harty ............................. 54/23 |
| 5,426,924 A | | 6/1995 | Harty ............................. 54/23 |
| 5,768,864 A | | 6/1998 | Chang ............................ 54/23 |
| 6,085,499 A | * | 7/2000 | Mead-Lewis .................. 54/22 |
| 6,397,783 B1 | * | 6/2002 | Koch .......................... 119/792 |
| 6,571,541 B1 | | 6/2003 | Rees .............................. 54/23 |

* cited by examiner

Primary Examiner—Robert P. Swiatek
(74) Attorney, Agent, or Firm—Phillip E. Decker

(57) ABSTRACT

A cover for an leg or tail strap for securing a blanket to a horse having a rectangular cover material secured at opposite edges to form a tube that is sized to fit over the leg or tail strap. The cover material is selected for its anti-chafe and washability characteristics. A securing mechanism is attached at each end of the tube for securing the cover to the ends of the straps. The cover is stretchy and replaceable. Using the covers over the straps allows the handler to tighten the straps much tighter than without the covers. This helps prevent chafing, discomfort, disease, and the likelihood of tripping on the straps.

17 Claims, 3 Drawing Sheets

REMOVABLE COVER FOR EQUINE LEG STRAPS AND TAIL STRAPS

BACKGROUND OF INVENTION

1. Field of the Invention

The invention is related to harnesses for securing a garment or blanket to an animal.

2. Description of the Related Art

Equine animals are often covered with a blanket or sheet to protect them from cold, rain, sun, and insects. It is difficult to keep a blanket or sheet on an animal, because rubbing and movement tend to shift the blanket from side to side and from back to front off the animal's body, and the animal is not likely to be able to adjust the blanket itself.

The blankets are typically attached using straps that encircle the animal's legs and/or tail. The animal's handler has the difficult task of adjusting the straps so that they are tight enough that the blanket does not shift, or cause a tripping hazard to the animal. However, the straps must be loose enough to avoid chafing the inside of the legs, and allow the animal to move about. The handler's ability to perform this adjustment is critical, because the animal can seriously injure itself by tripping, or becoming entangled by straps that are too loose. On the other hand, chafing from straps that are too tight can cause infection, cause unnecessary discomfort, and make the animal that is in discomfort impossible to ride. Strap material is selected for its strength and durability characteristics. Those characteristics often conflict with the need to be comfortable and non-abrasive to the animal's skin.

Another problem with the blanket straps that are typically used is that they become very soiled from feces and urine. Combined with chafing, the poor hygiene of the present system of straps for blankets can cause injury, and further discomfort for the animal. The strap material is typically a coarse and scratchy one-inch wide band about one-eighth of an inch thick. The material is either a synthetic with elastic, or nylon without elastic. Even the softest materials get coarse over time. Metal shackles are permanently attached to the ends of the straps. They are difficult to wash because the metal shackles damage ordinary washing machines. Also, after repeated uses, the straps will retain objectionable stains and odors, even after washing. Furthermore, the straps become more abrasive with each washing.

What is needed, therefore, is a leg and tail strap for an equine blanket that can be drawn tight without chafing, yet is completely comfortable, washable, and replaceable.

SUMMARY OF INVENTION

A leg and tail strap for an equine blanket or sheet that can be drawn tight without chafing, yet is completely safe, comfortable, washable, and replaceable is a strap cover comprising a substantially rectangular cover material secured at opposite edges to form a tube that is sized to fit over an equine leg or tail strap, wherein the cover material is selected for its anti-chafe and washability characteristics, and a securing mechanism at each end of the tube for removably securing the cover to at least one of a strap of an equine blanket. These, and other features and advantages are described in the accompanying description, drawings, and claims.

DETAILED DESCRIPTION

The invention comprises a substantially rectangular cover material secured at opposite ends to form a tube that is sized to fit over an equine leg or tail strap, wherein the cover material is selected for its anti-chafe and washability characteristics, and a securing mechanism at each end of the tube for removably securing the cover to at least one of a strap and an equine blanket. As used throughout this specification and claims, the term "blanket" is understood to include blankets, sheets, and all other animal coverings employing a tail strap, leg strap, or both.

Figure 1:
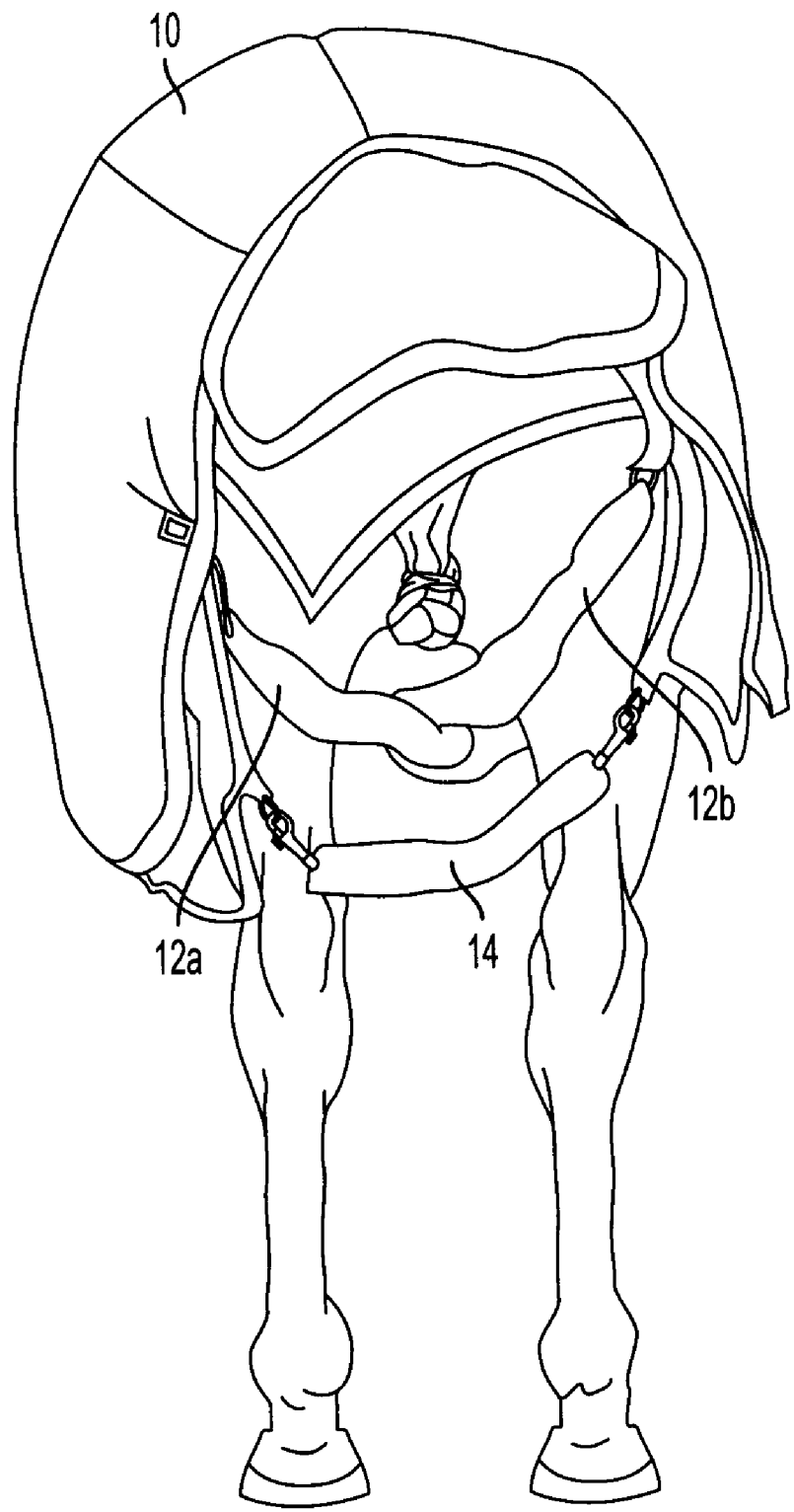
FIG. 1 is a rear view of a horse wearing a blanket secured by leg and tail straps which are enclosed by the covers of the present invention.

Turning to FIG. 1, a horse, for example, in cold weather is wearing a blanket 10 that is secured around its hind legs by leg straps surrounded by leg strap covers 12a, 12b according to the present invention. The ends of the straps are attached to the blanket 10 at different places, and they are typically crossed in the middle. A tail strap having a tail strap cover 14 prevents the blanket 10 from sliding forward. From the view of FIG. 1, it is clear that the animal's handler was able to tighten the straps having the covers 12a, 12b very tightly. Without the covers, one can easily see where the bare straps would chafe against the inside of the animal's legs and cause pain and perhaps injury and disease. Straps that are too loose can hang down near the hocks of the animal's hind legs. If the animal's hocks start to go over a strap, the animal will fall and may be seriously injured.

Figure 2:
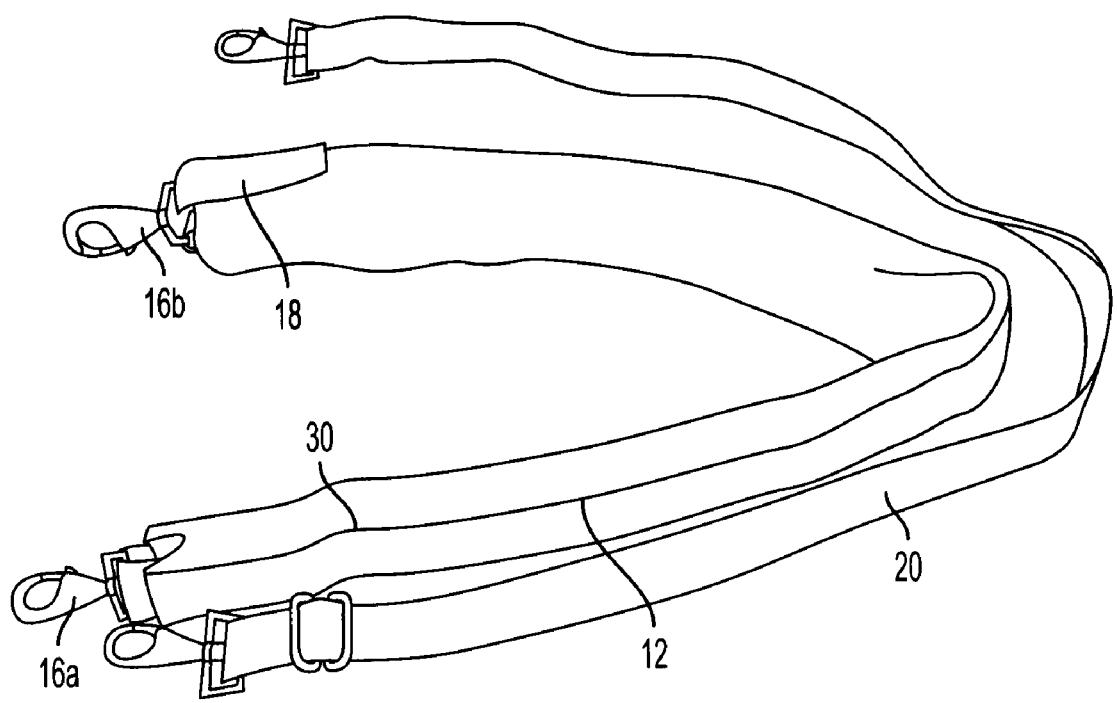
FIG. 2 is a layout of a strap with and without a cover.

FIG. 2 shows a bare strap 20 of the prior art next to a covered strap 12. The cover 12 is preferably applied over the strap 20 before it is put on an animal. The cover 12 is made of a material selected for its anti-chafe and washability characteristics. Although other materials could be used, the preferred materials include polar fleece, fleece, cotton, synthetic blended fabric, sheepskin, leather, suede, Lycra, natural and synthetic fabrics, textiles, and blends thereof. One can also select the fabric for its ability to stretch in one or more directions. For example, fleece stretches in only one direction, but Lycra stretches in two. It may be advantageous to select one over the other where material is found to have a tendency to bunch up in particular situations.

The material is cut into a rectangle, which is then formed into a tube by securing two opposite ends. Each end of the formed tube may be secured by snaps, hook and loop fasteners, ties, by sewing, or any other suitable securing means. Therefore, the ends may be removably secured, or permanently secured. As shown in FIG. 2, one embodiment has the ends 30 stitched together by sewing.

Metal shackles 16a, 16b are typically attached to the ends of the strap 20. The cover 12 of the present invention preferably has a securing mechanism 18 at each end of the cover. The securing mechanism 18 can engage the ends of the strap 20, engage the shackles 16a, 16b as shown in FIG. 2, or even engage the blanket 10 itself. The securing mechanism can be any suitable mechanism for securing a fabric cover to a strap, shackle, or blanket, but is preferably at least one taken from the group including hook and loop fasteners, ties, and snaps.

Figure 3:
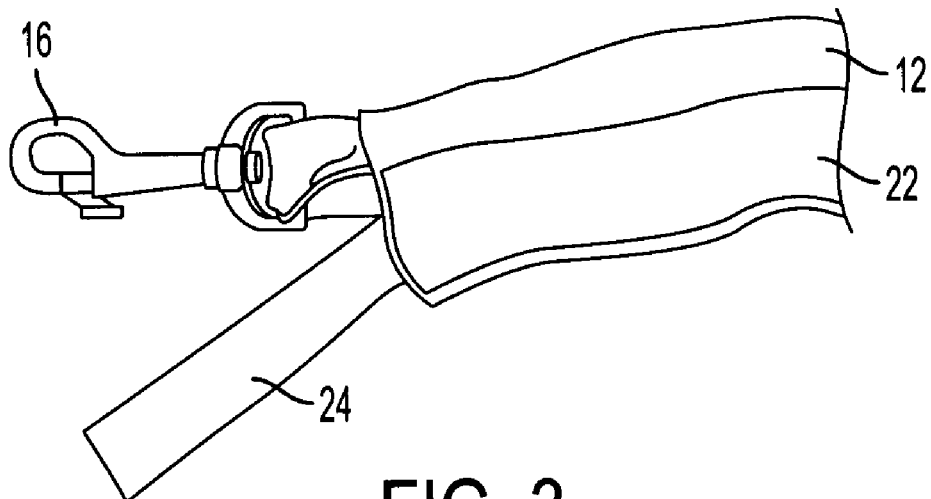
FIG. 3 shows the detail of a securing mechanism for securing a cover to a strap.
Figure 4:
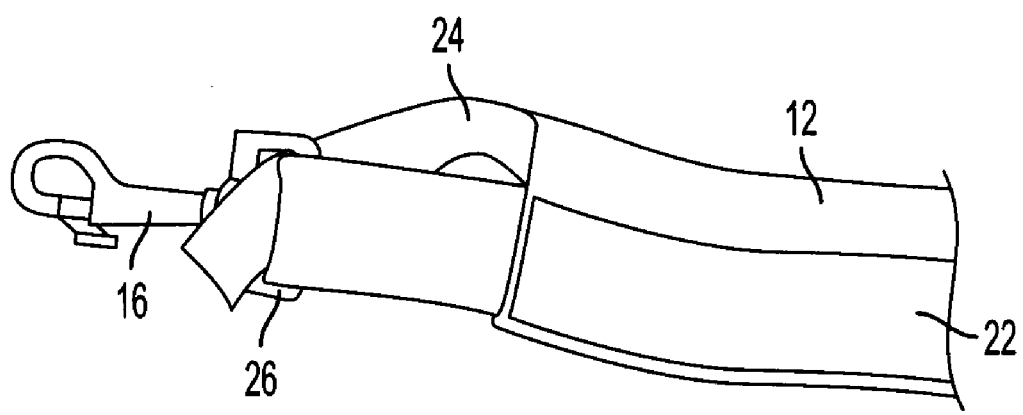
FIG. 4 shows the detail of the cover of FIG. 3 engaging a fastening mechanism on a strap.

In FIGS. 3 and 4, more details of the securing mechanism are shown. A first part 22 of the hook and loop fastener is attached to an end of the cover 12. A second part 24 of the hook and loop fastener is also attached at the end, preferably on the opposite side of the tube. This mechanism is adapted so that the second part 24 fits through a D-ring, if provided, on the shackle 16, and can then be secured to the first part 22, thereby securing the cover 12 onto the strap 20.

In use, the covers 12, 14 are applied over the leg and tail straps before they are put on an animal. The covers and straps are sized to fit the animal wearing the blanket. The straps are typically adjustable, so the covers should be sized to the lengths to which they will be used. In one embodiment, the covers should be no shorter than the shortest adjusted strap length, and no longer than the longest strap length when the strap is fully stretched. In another embodiment, the covers can be sized to be three times the minimum adjusted strap length, plus or minus fifteen percent. That way, the covers will naturally bunch up or compress on the shortest strap adjustment, yet cover the entire length of the strap at its maximum adjustment and stretch would be covered.

The equines for which this invention is suitable include those as small as minis, up to those as large as draft horses, warm bloods, and thoroughbreds. This invention is not intended to be limited only to equines. It is likely to be suitable for use with any other four-legged animal. The straps with the covers applied can safely be tightened much tighter than they could without the covers, because the covers make them comfortable and will not chafe the animal's skin. Because the straps are tight, the blanket, or garment, will not fall off and there is a reduced risk that the animal will trip over the straps and injure itself.

The covers 12, 14 will eventually become soiled with feces and urine. At that time, they can be easily removed from the straps, and washed in an ordinary washing machine. Because the covers do not have large metal parts like shackles attached to them, they will not damage the machine. The materials will be cleaned and retain their softness because they have been selected for their washability and anti-chafe characteristics. The covers may need to be replaced after many repeated uses.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A cover for an equine leg or tail strap for securing a blanket comprising
    a substantially rectangular cover material secured at opposite edges to form a tube that is sized to fit over an equine leg or tail strap, wherein the cover material is selected to stretch longitudinally along the axis of the tube and not stretch substantially radially, and for its anti-chafe and washability characteristics, and
    a securing mechanism at each end of the tube for removably securing the cover to at least one of a strap and an equine blanket.

2. The cover of claim 1, wherein the cover material is at least one of polar fleece, fleece, cotton, synthetic blended fabric, sheepskin, leather, suede, stretch fabric, natural and synthetic fabrics, textiles, and blends thereof.

3. The cover of claim 1, wherein the cover material is secured at opposite edges with at least one of snaps, hook and loop fasteners, and sewing.

4. The cover of claim 1, wherein the length of the tube is selected to fit the leg or tail strap of an equine between the sizes of miniature horse thoroughbreds, and draft horses.

5. The cover of claim 1, wherein the length of the tube is longer than the shortest adjusted strap length and shorter than the longest adjusted strap length when the strap is fully stretched.

6. The cover of claim 1, wherein the length of the tube is three times the minimum adjusted strap length, plus or minus fifteen percent.

7. The cover of claim 1, wherein the securing mechanism is at least one end of ties, hook and loop fasteners, and snaps.

8. A system for securing a blanket to an equine comprising
    two leg straps for securing to the blanket of a length sufficient to reach around one of an equine's hind legs, cross the other leg strap, and attach to the blanket,
    one tail strap for securing to the blanket of a length sufficient to reach under an equine's tail and attach to the blanket,
    two leg strap covers, each adapted to be removably secured to a leg strap,
    one tail strap cover adapted to be removably secured to a tail strap, wherein the cover material is selected for its anti-chafe and washability characteristics.

9. The system of claim 8, wherein the cover material is at least one of polar fleece, fleece, cotton, natural and synthetic blended fabric, sheepskin, woven wool, leather, suede, and stretch fabric.

10. The system of claim 8, wherein the cover material is selected to stretch longitudinally along the axis of the tube and not stretch significantly radially.

11. The system of claim 8, wherein the cover material is selected to stretch both longitudinally and radially along the axis of the tube.

12. The system of claim 8 wherein the cover material is selected to stretch radially but not significantly longitudinally.

13. The system of claim 8, wherein the cover material is secured at opposite edges with at least one of snaps, hook and loop fasteners, and sewing.

14. The system of claim 8, wherein the length of the tube is selected to fit the leg or tail strap of an equine between the sizes of miniature horses and draft horses.

15. The system of claim 8, wherein the length of the tube is longer than the shortest adjusted strap length and shorter than the longest adjusted strap length when the strap is fully stretched.

16. The system of claim 8, wherein the length of the tube is three times the minimum adjusted strap length, plus or minus fifteen percent.

17. The system of claim 8, wherein the securing mechanism is at least one of ties, hook and loop fasteners, and snaps.

* * * * *